(12) United States Patent
Penumatcha et al.

(10) Patent No.: US 7,431,515 B1
(45) Date of Patent: Oct. 7, 2008

(54) FIBER OPTIC TERMINI HAVING MULTIPLE CRIMP PORTIONS AND METHOD OF USING SAME

(75) Inventors: Venkata R. Penumatcha, Plano, TX (US); Vincent A. Wouters, McKinney, TX (US); Rodney M. Flower, Richardson, TX (US)

(73) Assignee: Applied Optical Systems, Inc., Plano, TX (US)

( * ) Notice: Subject to any disclaimer, the term of this patent is extended or adjusted under 35 U.S.C. 154(b) by 0 days.

(21) Appl. No.: 11/285,760

(22) Filed: Nov. 22, 2005

(51) Int. Cl.
*G02B 6/36* (2006.01)

(52) U.S. Cl. .............................. 385/81; 385/53; 385/76; 385/86

(58) Field of Classification Search ........................ None
See application file for complete search history.

(56) References Cited

U.S. PATENT DOCUMENTS 4,205,896 A * 6/1980 Borsuk ......................... 385/84
6,302,594 B1 * 10/2001 Lee ............................. 385/87

* cited by examiner

*Primary Examiner*—Tina M Wong
(74) *Attorney, Agent, or Firm*—Robert D. McCutcheon

(57) ABSTRACT

A fiber optic termini device having an inner bore for receiving a terminating end of a fiber optic cable includes a rearward extending crimp member or body. The crimp member is formed of two distinct portions, either integrally formed or by a combination of two separate components. A first portion has a first outside diameter while the second portion has a second outside diameter that is less than the outside diameter of the first portion. The second portion extends longitudinally rearward from the first portion. Both portions have crimp grooves or protrusions for securing material positioned between a crimp sleeve and the first and second portions.

18 Claims, 5 Drawing Sheets

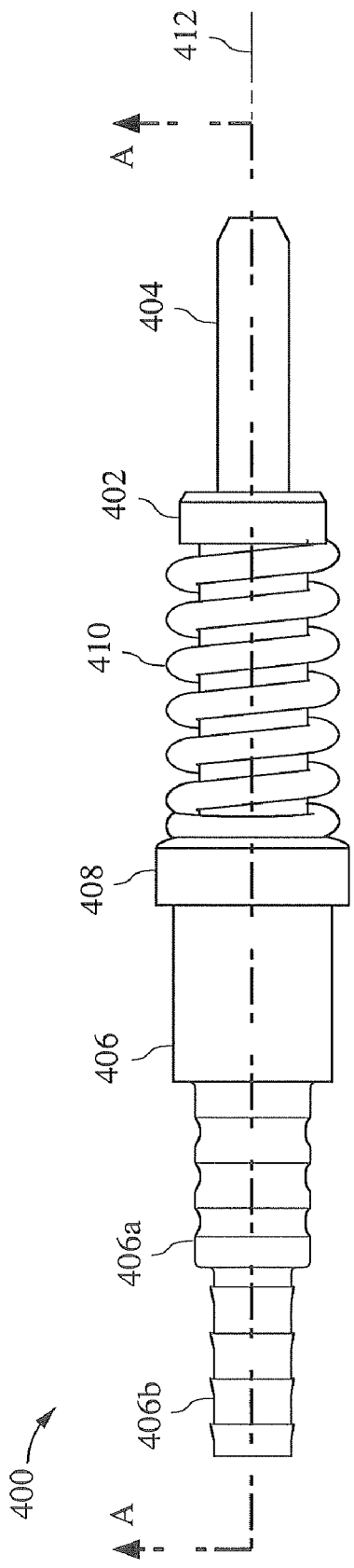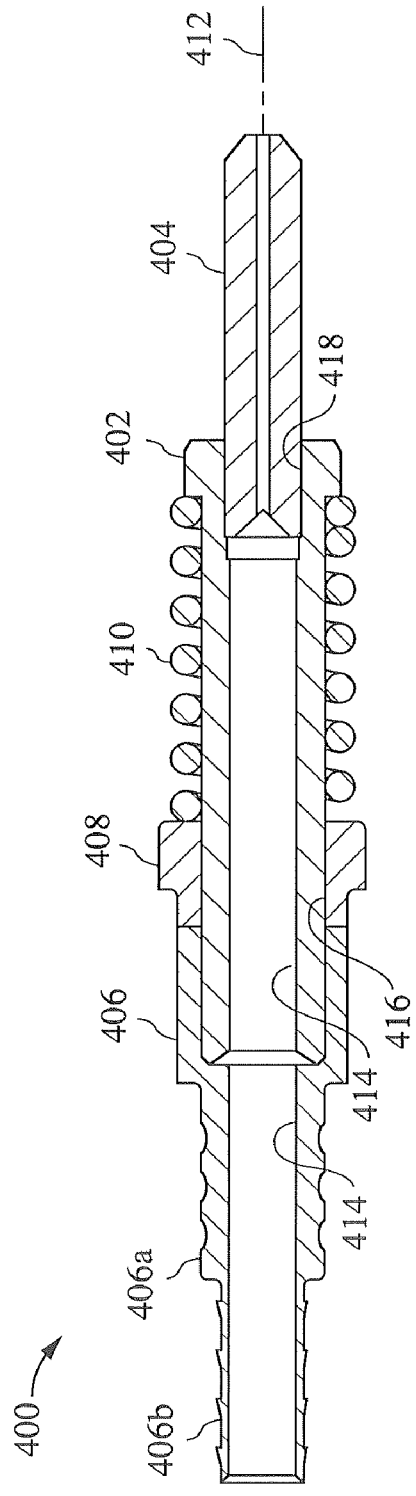
FIG. 4A
FIG. 4B

FIBER OPTIC TERMINI HAVING MULTIPLE CRIMP PORTIONS AND METHOD OF USING SAME

TECHNICAL FIELD

The present invention relates generally to fiber optic connectors, and more particularly to a fiber optic termini having multiple crimp portions for attaching fiber optic cable to the fiber optic termini.

BACKGROUND

FIG. 1 illustrates a prior art fiber optic termini 100 having a single crimping portion at the end of the termini, as described in U.S. Pat. No. 6,305,849 and which is incorporated herein by reference. It will be understood that prior art fiber optic termini 100 is typically used in sealed applications. Additional prior art fiber optic termini exist for non-sealed applications, and these termini are similar in general design to the prior art termini 100. As will be appreciated, the concepts and teachings of the present invention (as described in the Detailed Description section hereinafter) may be applied to fiber optic termini for sealed or non-sealed applications.

FIG. 1 is a longitudinal section view of the termini 100. The termini 100 is shown mounted on the terminal end of an optical fiber, and includes a pin body and a ferrule. The termini 100 has a longitudinal axis. The pin body has a longitudinally extending bore sized for receiving the optical fiber and the clad which extends around the core defined by the fiber. Reference is made to U.S. Pat. No. 6,305,849 for further descriptions of the termini 100

The fiber optic cables used and attached to the termini 100 generally include an inner optical fiber (for carrying an optical signal) surrounded by the clad or buffer layer, an outer protection layer around the buffer layer which usually includes fiber elements made of a high performance fiber (such as an aramid fiber, such as KEVLAR™, or a high strength polyethylene fiber), and an outer jacket protecting these inner layers.

When attaching or connecting a fiber optic cable to the termini 100, the buffer member (with fiber) is inserted through the bore and the outer protection layer and outer jacket are positioned around the single crimping member of termini 100.

Once the fiber optic cable is prepared and positioned, a crimp sleeve is placed and crimped around the fiber optic cable and the single crimping portion to attach the outer protection layer and outer jacket to the single crimping portion. Crimp sleeves may be used when the termini are utilized in any application, as desired, including within panel connectors and fiber optic cabling. Prior art fiber optic termini 100 includes crimp grooves formed into the rearward end (single crimping portion) of the termini 100. Typically, the crimp grooves extend circumferentially around the exterior periphery of the single rearward crimping portion of the termini 100, and the outer members of the fiber optic cable are positioned therebetween and compressed by crimping the crimp sleeve against the crimp grooves of the termini 100.

One problem with the use of the rear crimping portion of the prior art termini 100 is that when a significant force is applied longitudinally on the fiber optic cable (or termini), the crimp connection fails and the fiber optic cable detaches from the fiber optic termini.

Accordingly, there exists a need for a fiber optic termini device, and method of attaching a fiber optic cable to the termini, that provides a stronger and more robust connection or coupling mechanism between the cable and the termini.

SUMMARY

In accordance with one embodiment of the present invention, there is a fiber optic termini device including a pin body with first and second ends and an inner bore extending through at least a portion of the pin body. A fiber optic ferrule is secured to the first end of the pin body. A first crimping member extends from the first end of the pin body and includes an inner bore therethrough, an outer surface having an outer diameter, and one or more crimping protrusions extending radially from the outer surface operable for contacting material positioned between the first crimping member and a crimp sleeve. The termini further includes a second crimping member extending from the first crimping member and including an inner bore therethrough, an outer surface having an outer diameter, and one or more crimping protrusions extending radially from the outer surface and operable for contacting material positioned between the second crimping member and a crimp sleeve. The outer diameter of the first crimping member is greater than the outer diameter of the second crimping member.

In another embodiment, there is provided a method of coupling one end of a fiber optic cable to a fiber optic termini device. A fiber optic termini is provided having a pin body with first and second ends, first and second crimping members extending from the second end, and an inner bore extending through the first and second crimping members and at least a portion of the pin body. A first core member of a fiber optic cable is positioned within the inner bore. An inner layer of the fiber optic cable is positioned substantially along an outer surface of the first crimping member and substantially along an outer surface of the second crimping member. An outer layer of the fiber optic cable is positioned substantially about the second crimping member and proximate to the outer layer. A sleeve is positioned around the first and second crimping members. The sleeve is crimping at first and second locations about the first crimping member and the second crimping member thereby forcing the inner and outer layers against the first and second crimping members at the first and second locations, respectively, for securing the fiber optic cable to the fiber optic termini.

In yet another embodiment, there is provided a fiber optic termini including a cylindrical front pin body having a bore therethrough and a cylindrical rear pin body having a first end and a second end and a bore therethrough. The first end of the rear pond body is connected to the front pin body, and the front pin body and rear pin body together have a longitudinal axis. The rear pin body includes a first cylindrical bore member extending from the second end of the rear pin body and having an outer surface with a first outside diameter. The rear pin body further includes a second cylindrical bore member coupled to and extending from the first cylindrical bore member and having an outer surface with a second outside diameter less than the first outside diameter. Each of the cylindrical bore members includes one or more protrusions extending radially outward from the outer surface of the bore member.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 4A is a longitudinal side view of another embodiment of the a fiber optic termini in accordance with the present invention;

FIG. 4B is a longitudinal section view taken along section line A-A of FIG. 4A;

DETAILED DESCRIPTION

Figure 1:
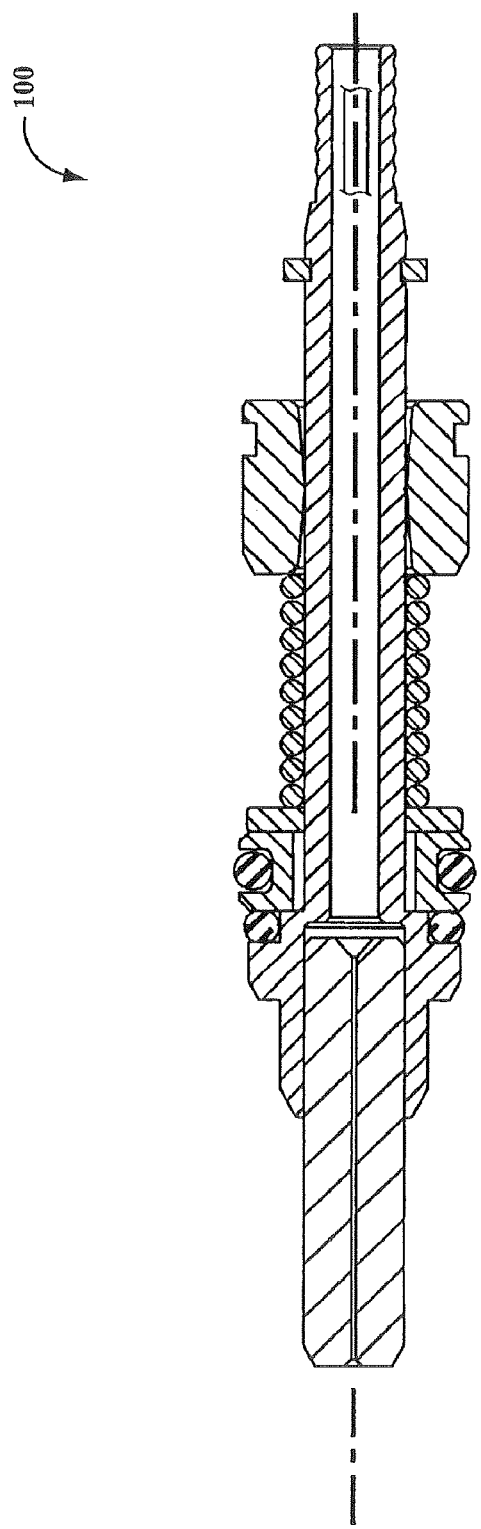
FIG. 1 illustrates a prior art fiber optic termini.

Now referring to FIG. 1, there is illustrated a fiber optic termini 200 in accordance with the present invention.

The fiber optic termini 200 includes a rear pin body 216 having a first portion 216a (referred hereinafter as crimp member) and a second portion 216b, which collectively form or operate as a crimp member. The first portion 216a may also be referred to herein as the first crimp member and the second portion may be referred to as the second crimp member or crimp member extension.). The crimp member extension 216b extends rearward from the pin body 216 (and the first crimp member), as illustrated. The first and second crimp members 216a, 216b have substantially equal inner bore diameters for inner bores extending therethrough which are operable for receiving the fiber and buffer members of a fiber optic cable (not shown). However, the effective outer diameter of the first crimp member 216a is greater than the effective outer diameter of the second crimp member 216b.

The first and second crimp members 216a, 216b may be separate components, or machined or formed from a single piece of material. For example, the first crimp member 216a may extend the entire length from the pin body 216 while the second crimp member 216b may include a sleeve placed over the member 216a and secured thereto.

Figure 2:
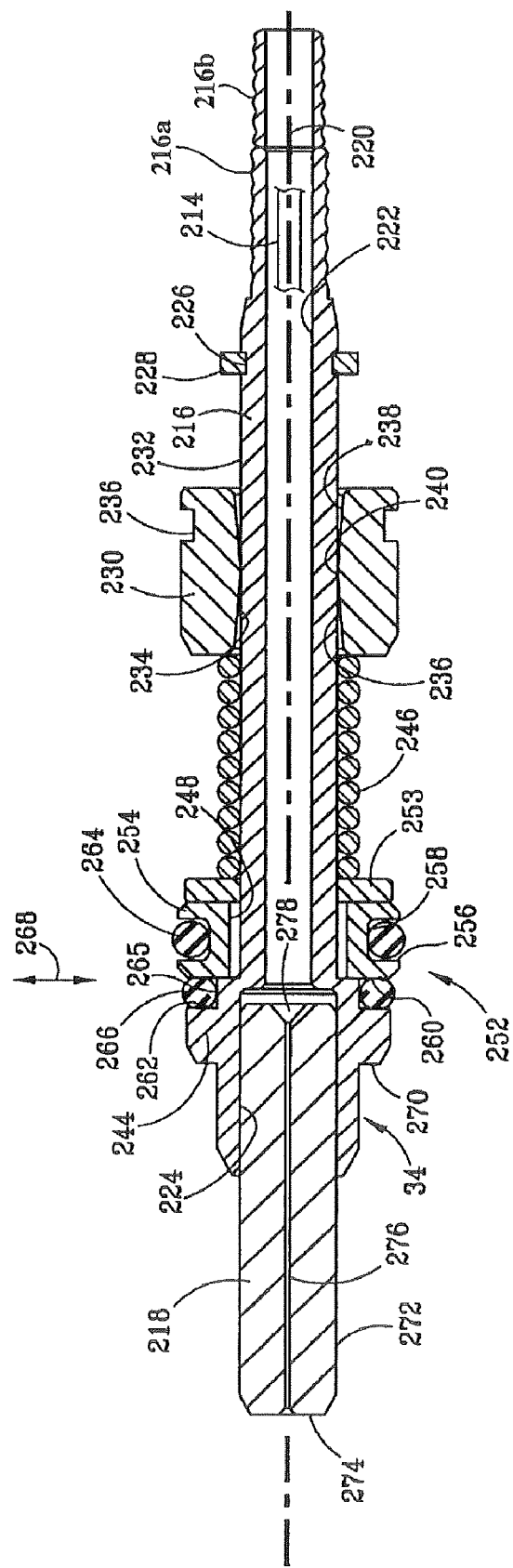
FIG. 2 depicts a fiber optic termini in accordance with one embodiment of the present invention.

A description of the remaining components (as shown with reference numerals) of the fiber optic termini 200 may be found in U.S. Pat. No. 6,305,849 which is incorporated herein by reference. It will be understood that the fiber optic termini 200 illustrated in FIG. 2 may include fewer, more or different components as specifically shown, without departing from the spirit and scope of the present invention.

Figure 3A:
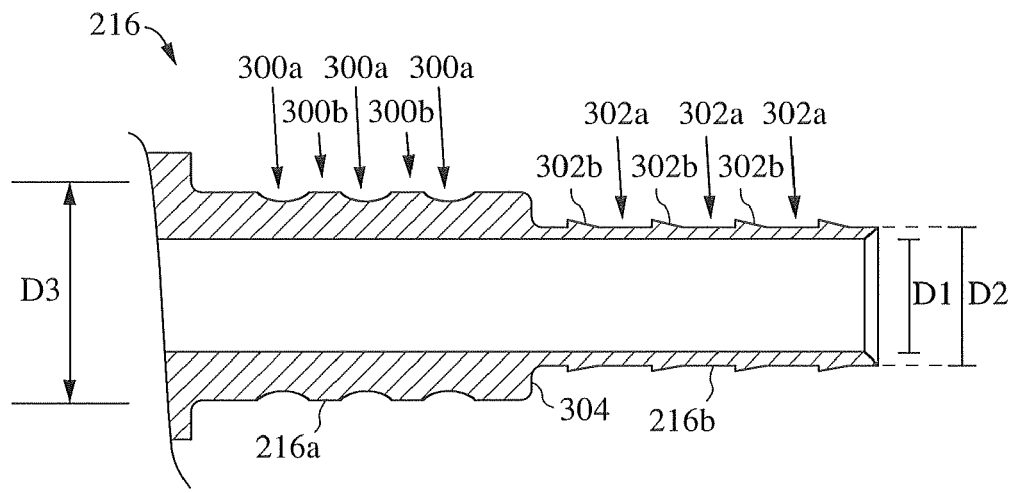
FIG. 3A illustrate a more detailed cross-sectional diagram of the rear pin body and crimp members of FIG. 2.
Figure 3B:
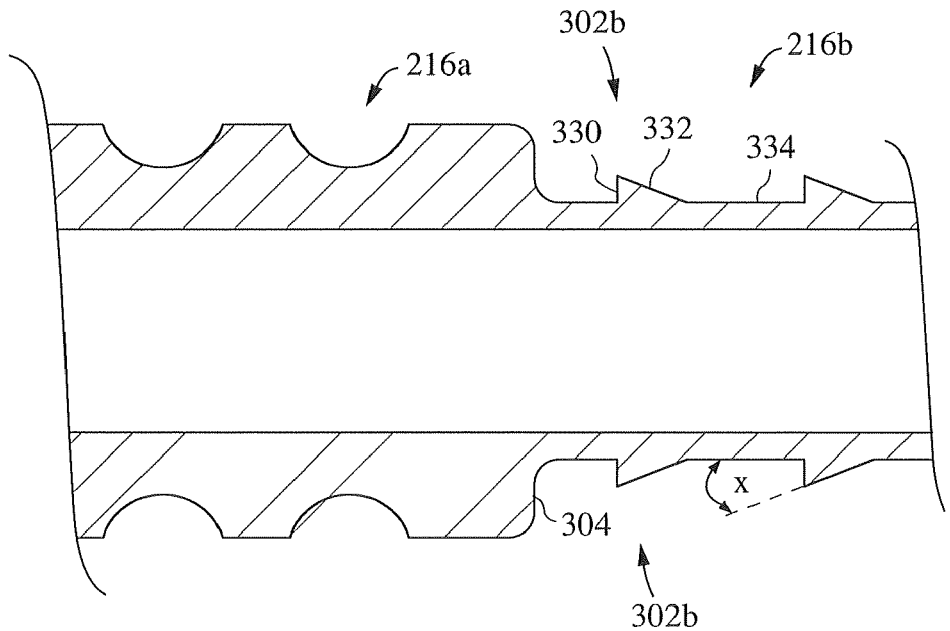
FIG. 3B is close-up detailed portion of the crimp members shown in FIG. 3A.

Now referring to FIGS. 3A and 3B, there is shown a more detailed cross-sectional diagram of the rear pin body 216 and the crimp members 216a, 216b (FIG. 3A) and a close-up detailed portion of the crimp members 216a, 216b. The first crimp member 216a extends rearward from the rear pin body 216 and the crimp member extension 216b extends rearward from the first crimp member 216a. The first crimp member 216a includes one or more crimp grooves 300a and the second crimp member 216b includes one or more crimp grooves (or barbs or tines) 302a. Inclusion of the grooves 300a, 302a within the outer surfaces results in radial extending protrusions 300b, 302b, respectively. The crimp grooves 300a extend circumferentially around the exterior periphery of the first crimp member 216a and the crimp grooves 302a of the second crimp member 216b may be similarly configured. Other configurations are possible (e.g., extend circumferentially around only a portion of the periphery). The first crimp member 216a further includes an annular shoulder 304 at the junction point of the first and second members 216a, 216b.

Each of the elongated crimp members 216a, 216b has an inner bore diameter D1 operable for receiving an end of a fiber optic cable (preferably the fiber and buffer members). Though the inner bore diameter of each member 216a, 216b is shown substantially equal, the inner bore diameters may be different, if suitable in a particular application. The first crimp member 216a has an outer diameter D3 while the second crimp member 216b has an outer diameter D2. In the embodiment shown, the outer diameter D3 is greater than the outer diameter D2.

As will be appreciated, the surface shape and configuration of the outer surfaces of the members 216a, 216b may be the same, substantially the same, or different. Now referring to FIG. 1, in one embodiment, the protrusions 302b are configured in a triangular shape, thus providing a sharper edge than that shown with respect to the crimp protrusions 300b. Each protrusion 302b includes a first wall 330 extending radially from the inner bore and substantially perpendicular to an outer surface 334. A sloped surface 332 extends from the base of the outer surface 334 to the outermost portion of the first wall 330. In one embodiment, the sloped surface is formed having a predetermined angle X from the outer surface 334. Different values of angle X may be chosen, as desired. In one specific embodiment, the angle X is about ten degrees, the spacing between successive protrusions along the crimp member extension is about 0.030 inches, and the outermost height of the protrusion is about between 0.002 and 0.003 inches. However, these dimensions may vary depending on the application.

In other embodiments, not shown, the protrusions 302b may be the same or similar in configuration and shape to the protrusions 300b of the first crimp member 216a. Other suitable shapes and configurations may be utilized, provided there is some uneven surface (i.e., with one or more protrusions or one or more grooves therein) that functions to assist in holding the fiber optic cable sheathing in place when crimped between the crimp member extension 216b (or surface thereof) and a crimp sleeve.

Now referring to FIGS. 4A and 4B, there are illustrated a longitudinal side view (FIG. 4A) and a longitudinal section view taken along section line A-A of FIG. 4A (FIG. 4B) of another embodiment of a fiber optic termini 400 in accordance with the present invention. It will be understood that the termini 400 of this embodiment may be suitably applicable in non-sealed applications.

The fiber optic termini 400 includes a front pin body 402, a ferrule 404, a rear pin body 406, a spring collar 408 and a spring 410. The fiber optic termini 400 has a longitudinal axis 412. The front and rear pin body 402, 406 have a longitudinally extending bore 414, and the front pin body 402 includes a forwardly disposed counter bore 418 and the rear pin body 406 includes a forwardly disposed counter bore 416, which are concentric with the longitudinal axis 412. The bore 414 is sized for receiving an optical fiber (not shown) and the clad (or buffer member) that extends around the optical fiber.

The ferrule 404 is rigidly secured in the forwardly disposed bore 418 and includes a central bore for receiving the fiber core of the optical fiber cable. The spring retaining collar 408 is secured around an exterior of the front pin body 402. The coil spring 410 extends around the exterior of the front pin body 402, between the forward end of the rear pin body 402 and the spring collar 408.

The rear pin body 406 includes a first crimp member 406a and a second crimp member 406b, which collectively form or operate as a crimp member. The members 406a, 406b are the same or substantially similar to the members 216a, 216b shown in FIGS. 2, 3A and 3B, and therefore, no further description is necessary regarding the structure, components and functionality of these crimp members except as noted below (reference is made to the description above).

Figure 5A:
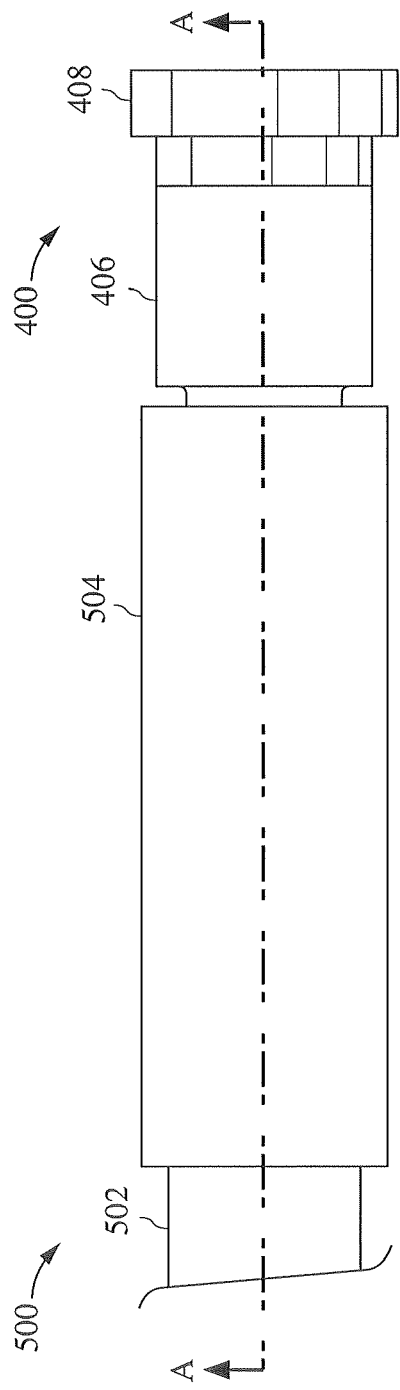
FIG. 5A is a longitudinal side view of a fiber optic termini assembly in accordance with the present invention.
Figure 5B:
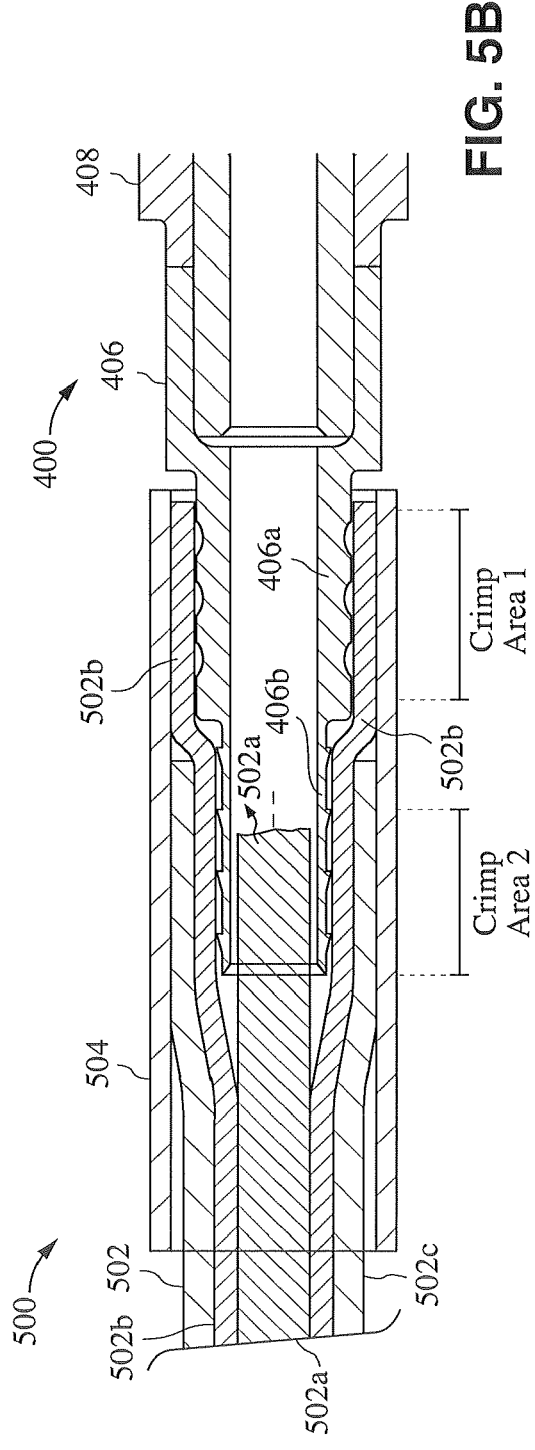
FIG. 5B is a longitudinal section view taken along section line A-A of FIG. 5A.

Now referring to FIGS. 5A and 5B, there are illustrated a longitudinal side view (FIG. 4A) and a longitudinal section view taken along section line A-A of FIG. 5A (FIG. 5B) of a fiber optic termini assembly 500 in accordance with the present invention.

The assembly 500 includes the fiber optic termini 400 shown in FIGS. 4A, 4B (or alternatively the fiber optic termini 200 shown in FIG. 2), an end portion of a fiber optic cable 502 and a crimp sleeve 504 (crimped state).

The fiber optic cable 502 include an inner optical fiber (not shown) surrounded by a buffer layer or member 502a. An outer sheath or cladding layer or member (protection member) 502b surrounds the buffer layer, while an outer jacket layer or member 502c protects the outer sheath or cladding member 502b. The composition and structure of the fiber optic cable 502 are known to those skilled in art, and may include additional members or layers of material.

In general, the member 502a is inserted and positioned within the inner bore 414 of the termini 400 and extends toward the ferrule 404, whereby the optical fiber extending through an inner bore of the ferrule 404 to the desired position. The cladding member 502b is positioned about the first crimp member 406a and a substantial portion of the second crimp member 406b and extends along the surfaces of these members 406a, 406b. The outer jacket member 502c is positioned about a substantial portion of the second crimp member 406b. The crimp sleeve 504 is positioned about the described structure. Crimp areas, designated generally as crimp area 1 and crimp area 2 in FIG. 5A, are utilized for crimping respective portions of the crimp sleeve 504 about the first crimp member 406a (crimp area 1) and the second crimp member 406b (crimp area 2). Crimping compresses the material of the crimp sleeve 502 such that material between the crimp sleeve and an inner crimp member (e.g., members 406a, 406b) is compressed therebetween, thereby readily securing the material from movement relative to the fiber optic termini 400. In this manner, the inserted end of the fiber optic cable 502 is secured to the fiber optic termini 400 forming the assembly 500.

In the prior art, as illustrated with respect to FIG. 1, the cladding material of the fiber optic cable is crimped to only a single and relatively uniform crimping member having a single effective outside diameter. Utilization of multiple crimp members or portions having different effective outside diameters increases the strength and reliability of the crimp assembly.

In accordance with the present invention, a method of securing the fiber optic cable 504 to the fiber optic termini 200, 400 is provided. The method includes providing the fiber optic termini device 200, 400 having a plurality of crimp members as described in FIGS. 2-5 and accompanying text. The optical fiber and buffer member 502a are inserted into a bored of the termini. The next outer layer 502b or member of the cable 504 is positioned around or about the second crimp member 216b, 406b and at least a substantial portion of the first crimp member 216a, 406a. The next outer layer or member 502c is positioned around at least a substantial portion of the second crimp member 216b, 406b.

A first portion of the crimp sleeve 504 is positioned substantially around the first crimp member 216a, 406a. A section portion of the crimp sleeve 504 is positioned around the second crimp member 216b, 406b. Pressure is applied to both the first and second portions of the crimp sleeve 504 to compress the sleeve about the members 216a, 216b, 406a, 406b. Crimping of each portion may occur at the same or different times. In another embodiment, the crimp sleeve 504 includes two separate crimp sleeves.

Figure 6:
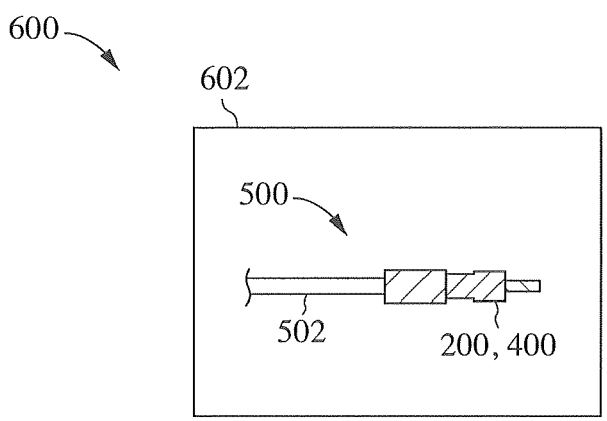
FIG. 6, there is illustrated an apparatus 600 including one or more components (not shown) for generating or receiving an optical signal.

Now referring to FIG. 6, there is illustrated an apparatus 600 including one or more components (not shown) for generating or receiving an optical signal. The apparatus 600 further includes a housing 602 and the fiber optic termini assembly 500 in accordance with the present invention. In one embodiment, the apparatus 600 is an electrical connector with an electrical housing 602 having one or more terminals for electrical connection. As will be appreciated, the term "electrical" refers to conventional electrical signals using electrically conductive terminals, such as electrical signals carried via a conductor, and also includes optical signals carried via fiber.

Though the embodiments are described herein with respect to a fiber optic termini device and related suitable applications, another embodiment contemplates that the concepts and teachings of the present invention may be utilized in other terminals or termini, and thus not limited to fiber optic termini.

In another embodiment, the fiber optic termini 200, 400 and/or fiber optic termini assembly 500 may be incorporated in a single or multi-channel fiber optic connector, as described in U.S. Pat. No. 6,305,849.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A fiber optic termini comprising:
 a pin body having a first end and a second end, and a first inner bore extending through at least a portion of the pin body;
 a fiber optic ferrule secured to the first end of the pin body;
 a first crimping member extending from the second end of the pin body, the first crimping member comprising,
  a second inner bore therethrough and having a first inner diameter,
  an outer surface having an outer diameter, and
  one or more crimping protrusions extending radially from the outer surface of the first crimping member and operable for contacting material positioned between the first crimping member and a crimp sleeve;

a second crimping member extending laterally from an end of the first crimping member, the second crimping member comprising,
  a third inner bore therethrough and having a second inner diameter,
  an outer surface having an outer diameter, and
  one or more crimping protrusions extending radially from the outer surface of the second crimping member and operable for contacting material positioned between the second crimping member and a crimp sleeve; and
wherein the outer diameter of the first crimping member is greater than the outer diameter of the second crimping member and the first inner diameter of the first crimping member is substantially equal to the second inner diameter of the second crimping member.

2. The termini in accordance with claim 1 further comprising at least two crimping protrusions extending substantially circumferentially around the first crimping member and at least two crimping protrusions extending substantially circumferentially around the second crimping member.

3. The termini in accordance with claim 1 wherein the at least one crimping protrusion of the second crimping member is triangular shaped.

4. The termini in accordance with claim 3 wherein the at least one crimping protrusion of the second crimping member includes a first wall portion extending substantially perpendicular to the outer surface and having an outermost point and a slope portion extending from the outermost point to the outer surface.

5. The termini in accordance with claim 4 wherein the at least one crimping protrusion of the second crimping member forms a circumferential ring protrusion about the outer surface of second crimping member.

6. The termini in accordance with claim 5 wherein the at least one crimping protrusion of the second crimping member further comprises at least two crimping protrusions.

7. The termini in accordance with claim 1 wherein the first crimping member and the second crimping member collectively form a crimp member comprising a single piece of material.

8. A method of attaching one end of a fiber optic cable to a fiber optic termini, the method comprising:
  providing the fiber optic termini having a pin body having a first end and a second end, first and second crimping members extending from the second end, and an inner bore extending through the first and second crimping members and at least a portion of the pin body;
  positioning a first core member of a fiber optic cable within the inner bore;
  positioning an inner layer of the fiber optic cable substantially along an outer surface of the first crimping member and substantially along an outer surface of the second crimping member;
  positioning an outer layer of the fiber optic cable substantially about the second crimping member and proximate to the outer layer;
  positioning a sleeve around the first and second crimping members;
  crimping the sleeve at first and second locations about the first crimping member and the second crimping member thereby forcing the inner and outer layers against the first and second crimping members at the first and second locations, respectively, for securing the fiber optic cable to the fiber optic termini.

9. The method in accordance with claim 8 wherein the first and second crimping members each include at least one protrusion.

10. The method in accordance with claim 9 wherein the at least one protrusion of the first and second crimping members and the crimp sleeve function to secure the inner and outer layers therebetween.

11. The termini in accordance with claim 8 wherein the first crimping member and the second crimping member are formed from a single piece of material.

12. A fiber optic termini comprising:
  a cylindrical front pin body having a bore therethrough; and
  a cylindrical rear pin body having a first end and a second end and a bore therethrough wherein the first end is connected to the front pin body, the front pin body and rear pin body together having a longitudinal axis, the rear pin body comprising,
    a first cylindrical bore member extending from the second end of the rear pin body and having an outer surface with a first outside diameter and an inner bore surface having a first inner bore diameter, the first cylindrical bore member including one or more protrusions extending radially outward from the outer surface, and
    a second cylindrical bore member coupled to and extending laterally from an end of the first cylindrical bore member and having an outer surface with a second outside diameter less than the first outside diameter and having an inner bore surface having a second inner bore diameter substantially equal to the first inner bore diameter, the second cylindrical bore member including one or more protrusions extending radially outward from the outer surface.

13. The termini in accordance with claim 12 further comprising at least two crimping protrusions extending substantially circumferentially around the first cylindrical bore member and at least two crimping protrusions extending substantially circumferentially around the second cylindrical bore member.

14. The termini in accordance with claim 12 wherein the one or more protrusion of the second cylindrical bore member is triangular shaped.

15. The termini in accordance with claim 14 wherein the one or more protrusion of the second cylindrical bore member includes a first wall portion extending substantially perpendicular to the outer surface of the second bore member and having an outermost point and a slope portion extending from the outermost point to the outer surface.

16. The termini in accordance with claim 15 wherein the one or more protrusion of the second cylindrical bore member forms a circumferential ring protrusion about the outer surface of second cylindrical bore member.

17. The termini in accordance with claim 16 wherein the one or more protrusion of the second cylindrical bore member further comprises at least two such protrusions.

18. The termini in accordance with claim 12 wherein the first crimping member and the second crimping member collectively form a crimp member comprising single piece of material.

* * * * *